US010214696B2

(12) United States Patent
ShahiMoghani et al.

(10) Patent No.: US 10,214,696 B2
(45) Date of Patent: Feb. 26, 2019

(54) SYSTEM AND METHOD OF REFINING USED OIL

(71) Applicants: Aref ShahiMoghani, Gorgan (IR); Seyedhamed Mirostvarmoghadam, Gorgan (IR); Masoud Shahzeeipour, Azadshahr (IR)

(72) Inventors: Aref ShahiMoghani, Gorgan (IR); Seyedhamed Mirostvarmoghadam, Gorgan (IR); Masoud Shahzeeipour, Azadshahr (IR)

(*) Notice: Subject to any disclaimer, the term of this patent is extended or adjusted under 35 U.S.C. 154(b) by 0 days.

(21) Appl. No.: 15/940,979

(22) Filed: Mar. 30, 2018

(65) Prior Publication Data

US 2018/0223195 A1 Aug. 9, 2018

(51) Int. Cl.
*C10G 53/02* (2006.01)
*C10G 21/28* (2006.01)
*B01J 19/18* (2006.01)
*C10G 21/00* (2006.01)

(52) U.S. Cl.
CPC ............. *C10G 53/02* (2013.01); *B01J 19/18* (2013.01); *C10G 21/006* (2013.01); *C10G 21/28* (2013.01); *C10G 2300/1007* (2013.01); *C10G 2300/44* (2013.01)

(58) Field of Classification Search
CPC ........ B01J 19/18; C10G 21/006; C10G 21/28; C10G 53/02; C10G 2300/1007; C10G 2300/44; C10M 175/005; C10M 175/0016
See application file for complete search history.

(56) References Cited

U.S. PATENT DOCUMENTS

| 3,930,988 | A | 1/1976 | Johnson |
| 4,179,454 | A | 12/1979 | Mehta et al. |
| 9,228,133 | B2 | 1/2016 | Liu et al. |
| 9,604,153 | B1 | 3/2017 | Quinlan |
| 9,856,185 | B2 | 1/2018 | Griffith Cruz et al. |
| 2016/0153317 | A1 | 6/2016 | Geskes et al. |

*Primary Examiner* — Lessanework Seifu
(74) *Attorney, Agent, or Firm* — NovoTechIP International PLLC

(57) ABSTRACT

An improved system and method for refining various types of used oil involves using solvents to treat used oil in a system designed to recycle the solvents and produce minimal waste byproducts. The system includes a main reactor for enabling the used oil and the solvents to react chemically and for wasted products to dissipate and separate through sedimentation. The system also includes a reservoir for providing a second opportunity for a chemical reaction and sedimentation of waste byproducts before the mixture of refined oil and solvents enter a housing unit configured to be heated to separate the refined oil from the solvents via vaporization and subsequent condensation. Thereby, the solvents are recycled and made available for reuse in further treatment of used oil.

20 Claims, 6 Drawing Sheets

SYSTEM AND METHOD OF REFINING USED OIL

TECHNICAL FIELD

The present application relates generally to treating used oil, and more particularly to an improved system and method of refining used oil.

BACKGROUND

Large amounts of industrial and motor oil are used every day around the world in various industries and/or engines. The resulting product after the oil is hard to dispose of and in most cases an environmental hazard. On the other hand, used oil, once properly treated could be a potential resource for reuse in a variety of different industries.

Many different approaches exist for refining various types of used oil. However, most of these methods are either inefficient and/or result in low quality refined oil or are too complex and expensive to use. For example, one of the most commonly used methods of refining used oil which uses sulfuric acid and ash produces a lube stock suited for use as a low-grade motor oil or as a grease base. Moreover, this process results in producing a byproduct of acid sludge and clay which is environmentally hazardous and difficult to dispose of.

Other existing methods include vacuum distillation with thin film evaporation, evaporation of thin film with hydrotreating of distilled oil to lube stock, thermal dehumidification with hydrotreatment of the oil, and solvent extraction with hydrotreatment. Each of these methods exhibits some disadvantages. For example, the distillation and thermal dehumidification techniques are complex in nature due, at least in part, to high temperatures required for the processes. Moreover, in general, these processes use a lot of energy, which can be costly. The solvent extraction process also requires a large amount of solvent, which is usually several (at least four to six) times the volume of the oil being treated, and such leads to high costs and solvent recovery problems.

Therefore, a need exists for providing an improved system and method of refining used oil that results in high quality refined oil, while producing small quantities of undesirable waste products, and the system is inexpensive to design and operate.

SUMMARY

A system for treating used oil is provided. In one implementation, the system includes a reactor having at least one inlet port for receiving used oil and a solvent into a main body of the reactor, the main body providing an environment for the used oil and the solvent to have a chemical reaction to produce a fluid mixture and at least some waste byproducts, the reactor having at least one fluid outlet for routing the fluid mixture out of the main body and one opening for routing the waste byproducts out of the reactor. The system also includes a reservoir connected to the at least one fluid outlet for receiving the fluid mixture, the reservoir having a reservoir main body for providing an environment for the fluid mixture to further dissipate waste byproducts to a bottom layer of the fluid mixture, the reservoir also having an outlet channel for routing a top layer of the fluid mixture outside of the reservoir main body and the reservoir having a reservoir waste outlet channel for routing the dissipated waste byproducts outside the reservoir. Furthermore, the system may include a housing connected to the reservoir outlet channel for receiving the top layer of the fluid mixture, the housing having a top opening and a housing outlet channel, a heating unit for heating the housing to cause the solvent present in the top layer of the fluid mixture to vaporize and escape through the top opening, a condensation unit for receiving the vaporized solvent and turning the vaporized solvent to liquid, the condensation unit having an outlet channel for routing the liquid into the main body of the reactor for reuse, and a storage unit for collecting treated oil. The housing outlet channel provides a route for any remaining fluid in the housing after the vaporized solvent has escaped to flow out of the housing and into the storage unit.

BRIEF DESCRIPTION OF THE DRAWINGS

Features of the subject technology are set forth in the appended claims. However, for purpose of explanation, several implementations of the subject technology are set forth in the following figures.

DETAILED DESCRIPTION

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings. As part of the description, some of this disclosure's drawings represent structures and devices in block diagram form in order to avoid obscuring the invention. In the interest of clarity, not all features of an actual implementation are described in this specification. Moreover, the language used in this disclosure has been principally selected for readability and instructional purposes, and may not have been selected to delineate or circumscribe the inventive subject matter, resort to the claims being necessary to determine such inventive subject matter. Reference in this disclosure to "one embodiment" or to "an embodiment" means that a particular feature, structure, or characteristic described in connection with the embodiment is included in at least one embodiment of the invention, and multiple references to "one embodiment" or "an embodiment" should not be understood as necessarily all referring to the same embodiment.

A significantly large amount of used lubricating oil is drained, dumped or burned each year around the world. These oils have generally been used as industrial oil, engine lubricants, transmission and gear oils and the like. Most of this oil could be reused if it is collected and effectively reprocessed. Many processes are available for the purification and reprocessing of used oils. However, most of the available processes are inefficient, expensive or result in undesirable waste products.

A solution is proposed here to solve these issues and more by providing an improved system and method of refining various types of used oil. In one embodiment, the improved system of refining used oil involves using a solvent with a polarity that is complementary to the polarity of the used oil. The improved system includes a main reactor for enabling the used oil and the solvents to have a chemical reaction whereby at least a portion of the used oil is refined and waste products are dissipated through sedimentation. The improved system also includes a reservoir for providing a second opportunity for chemical reaction and sedimentation of waste products before the mixture of refined oil and solvents enter a housing unit configured to be heated to separate the refined oil from the solvents via vaporization and subsequent condensation. In this manner, the improved system recycles the solvents and makes them available for reuse in further treatment of used oil.

Figure 1:
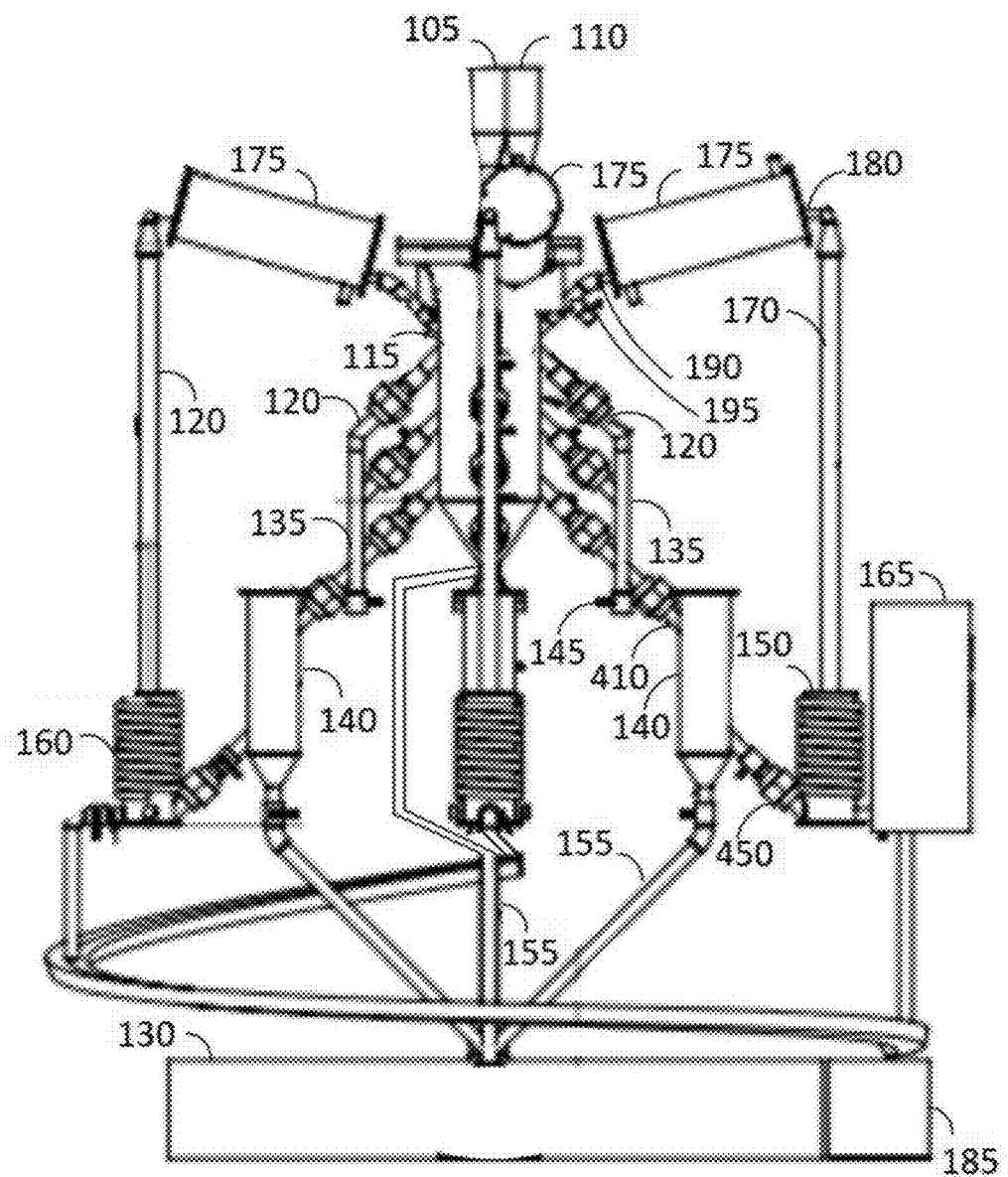
FIG. 1 is a schematic drawing of an improved system for refining used oil.

FIG. 1 illustrates one implementation of an improved system 100 for refining used oil. System 100 includes an inlet port 105 for receiving used oil and an inlet port 110 for receiving a solvent for refining the used oil. The used oil can be any engine or industrial oil that has been used and now requires treatment for reuse. The solvent can be any solution known for treating the particular type of used oil being refined. Studies by the inventors have shown that solubility of used oil varies with the polarity of both the used oil and the solvent. For example, polar oils have been shown to be more soluble in polar solvents and non-polar oils have been shown to be more soluble in non-polar oils. This is shown in Table 1. Table 1 also shows the strong and weak solvency selectivity. This can be used as a basic rule for choosing the best solvent for separation of compounds.

TABLE 1

| Polarity of Soluble | Polarity of Solvent | Strength of Soluble | Strength of Solvent | Soluble/ Solvent | Solubility of soluble in solvent |
|---|---|---|---|---|---|
| Non-polar | Non-polar | Weak | Weak | Weak | High |
| Non-polar | Polar | Weak | Strong | Weak | Low |
| Polar | Non-polar | Strong | Weak | Weak | Low |
| Polar | Polar | Strong | Strong | Strong | High |

Thus, in one implementation, a non-polar solvent such as hexane is used for non-polar used oil and a polar solvent such as dimethyl ketone is used for impurities such as water that are polar compounds. Tables 2 shows variations in solubility for different soluble solutions.

TABLE 2

| Solvent | $\delta_1-\delta_2$ | Solvent | $\delta_1-\delta_2$ |
|---|---|---|---|
| 1-butanol | 7 | Propanone | 4.1 |
| 1-propanol | 8.2 | N-hexane | 9.1 |
| 2-propanol | 7.4 | Cyclo hexane | 0.5 |
| Ethanol | 8.1 | Bentente | 2.4 |
| Butanone | 2.8 | Dimethylketone (DMK) | 9.4 |

The degree of selectivity and the solubility power are based on the difference between the solubility parameters. This difference is shown in Table 2. As shown, according to Table 2, N-hexane and Dimethyl ketone (DMK) has the highest solubility capacity. Based on the variations shown in Table 2, a suitable solvent can be chosen based on the type and polarity of the used oil being refined. Referring back to FIG. 1, system 100 includes a reactor 115 into which the selected solvent and the used oil are initially poured in. The reactor 115 is a reservoir designed for accommodating chemical reactions between the selected solvent and the used oil and for allowing impurities to settle in the bottom of the reactor as sediments. The chemical reaction between the used oil and the solvent causes hydrocarbon particles present in the used oil compound to move to the top layer of the mixed solution, while heavy impurities settle in a bottom layer.

Figure 2:
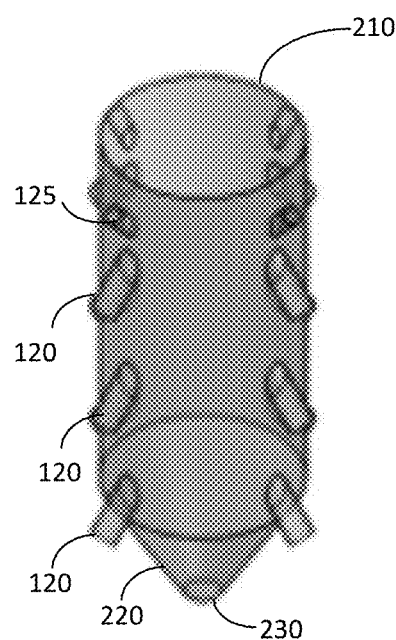
FIG. 2 is a schematic drawing of a reactor (mixing tank) used in the improved system for refining used oil.

FIG. 2 depicts a schematic drawing of the structure of the reactor 115. As shown, the reactor 115 includes a main cylindrical body 210 which is attached to a cone-shaped outlet 220 for facilitating sedimentation and removal of separated impurities in the bottom of the reactor 115. The cone-shaped outlet 220 includes an opening 230 for the sedimented impurities to escape from. The opening 230 is connected, in one implementation, to a tube 155 (shown in FIG. 1) which transfers the impurities to a waste storage housing 130 (shown in FIG. 1) for storage and later disposal. In one implementation, the tube 155 includes a valve (not shown) for opening and closing a passageway between the opening 230 and the tube 155, such that the fluid mixture can be kept in the reactor 115 until the refined oil and solvent mixture is removed, before the sediments are routed to the waste storage housing 130.

The cylindrical body 210 of the reactor 115 provides the appropriate space and environment for chemical reaction between the solvent and the used oil and facilitation of settling of heavier impurities in the bottom of the reactor 115. The majority of the lightweight hydrocarbon compositions and solvents remain on top of the reactor 115 and flow out of a plurality of tube-shaped outlets 120. In one implementation, the reactor 115 includes four sets of tube-shaped outlets. Each set of tube-shaped outlets includes three equally spaced tube-shaped outlets 120. The four sets are positioned around the cylindrical body 210 and are each equally spaced from the next two adjacent sets such that the solvent and refined oil mixture can easily transfer out of the tube-shaped outlets 120. The tube-shaped outlets 120 face downward so that the fluid can be easily routed out of the reactor. The shape and design of the tube-shaped outlets 120 facilitates easy removal of the oil and solvent mixture to a second reservoir for further processing. The reactor 115 also includes four inlet channels 125 for entering recycled solvents, as discussed further below. Each one of inlet channels 125 faces upwards for receiving the recycled solvents and each is aligned with one set of tube-shaped outlets 120 for a more functional design.

Figure 3:
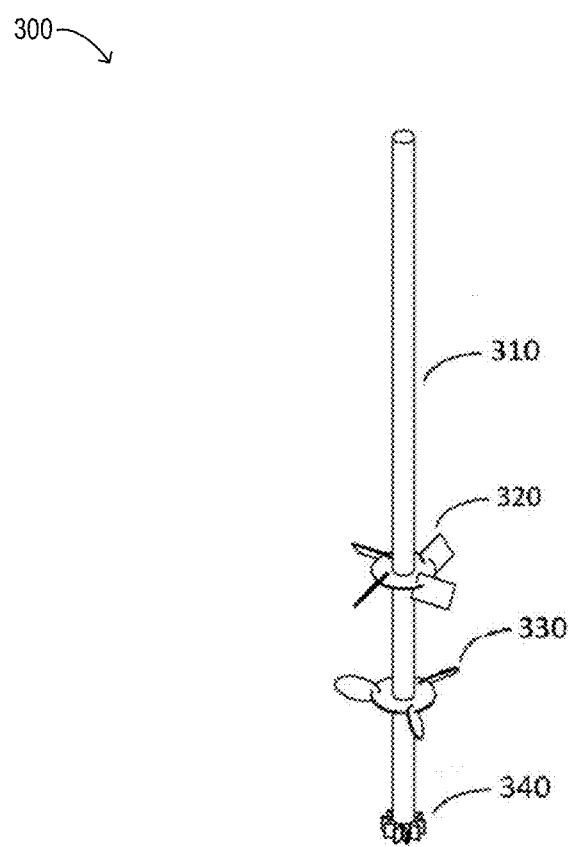
FIG. 3 is a schematic drawing of a mixer used inside the reactor of the improved system for refining used oil.

In one implementation, the reactor 115 also includes a mixer 300 for mixing the used oil and solvent solutions to facilitate their chemical reaction and sedimentation of undesired particulars at the bottom of the reactor 115. One implementation of the mixer 300 is depicted in FIG. 3. The mixer 300 includes an elongated axle 310 designed to fit properly and rotate inside the reactor 115. The mixer 300 may be connected to a motor (not shown) which is itself connected to a power switch (not shown) for enabling the user to turn the mixer on and off. In another implementation, the mixer may automatically start rotating once the system 100 is turned on. The mixer 300 may include three types of impellers that are positioned along the axle 310 for mixing the solution. These impellers include a set of four blade propellers 320, a set of square pitch prop propellers 330, and a set of dispersion blade propellers 340 for mixing the materials in the bottom of the reactor 115. The types and numbers of the impeller sets may vary. For example, the types of impellers may be selected based on the expected composition of the used oil and the solvents. In one implementation, the mixer 300 may be removable and exchangeable with a different mixer 300 having a different number and/or different types of impellers for different types of used oil or solvents. The mixer 300, may be held in place by a variety of known methods in the art. For example, the mixer 330 may be held in place by a horizontal rod attached to the inside of the reactor which includes an opening through which the mixer 300 passes and by which the mixer is held in place. The details and operation of different types of impellers are known in the art and will not be discussed here in detail.

Figure 4:
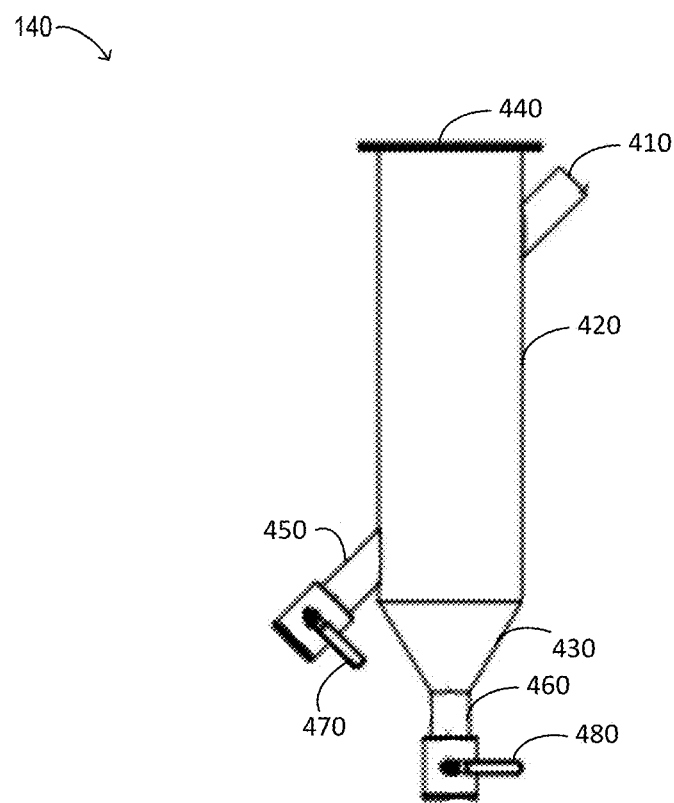
FIG. 4 is a schematic drawing of a stabilizer tank (surge tank) used in the improved system for refining used oil.

Referring back to FIG. 1, the system 100 also includes four pipes 135 (because of symmetry in the geometry of the system, only two are shown), each of which connects, via two separate openings, to the first two tube-shaped outlets 120 of each set of tube-shaped outlets, in order to facilitate transfer of the fluid solution exiting the reactor 115 through those openings to the last tube-shaped outlet 120. This is done by connecting the bottom end of each pipe 135 to the last tube-shaped outlet 120 in each set of the tube-shaped outlets 120. The last tube-shaped outlet 120 is in turn connected to an inlet channel 410 of the reservoir 140. In order to control the flow of fluids out of the reactor 115, each pipe 135 includes a control valve 145 for opening or closing the passageway to the inlet channel 410, as needed. This enables the system 100 to allow the chemicals enough time to react and separate in the reactor 115 before the top layer is routed to the reservoir 140 for further stabilization and secondary sedimentation of particles that may not have been precipitated in the reactor 115. The external structure of the reservoir 140 is depicted in FIG. 4.

Similar to the reactor 115, the reservoir 140 includes a cylindrical body 420 which is attached to a cone-shaped unit 430 in the bottom. However, in contrast to the reactor 115, the top of the cylindrical body 410 of the reservoir 140 is covered with a cover 440. Thus, the fluids entering the reservoir 140 enter through the inlet channel 410 and exit through an outlet channel 450. While inside the reservoir 140 the fluid mixture which still, at this stage, may include some impurities, has an opportunity for further chemical reaction and separation. Thus, the reservoir 140 provides an environment for further treatment and refining of the used oil. As a result of the chemical reaction between the solutions, some unwanted sediments will dissipate to the bottom of the reservoir 140. These sediments can exit through a sediment outlet channel 460 which is attached to an opening (not shown) of the cone-shaped unit 430. The outlet channel 450 and the outlet channel 460 include a control valve 470 and a control valve 480, respectively, for opening or closing the outlet channels, as needed. For example, when the fluid first enters the reservoir 140, both of the outlet channels 450 and 460 may be blocked for a specific period of time to allow the mixture to separate properly before they exit the reservoir. Once the required amount of time has passed, the valve 470 may first be opened to allow the mixture of refined oil and solvent to exit the reservoir, before the valve 480 is opened to allow the precipitated sediments to exit.

Figure 5:
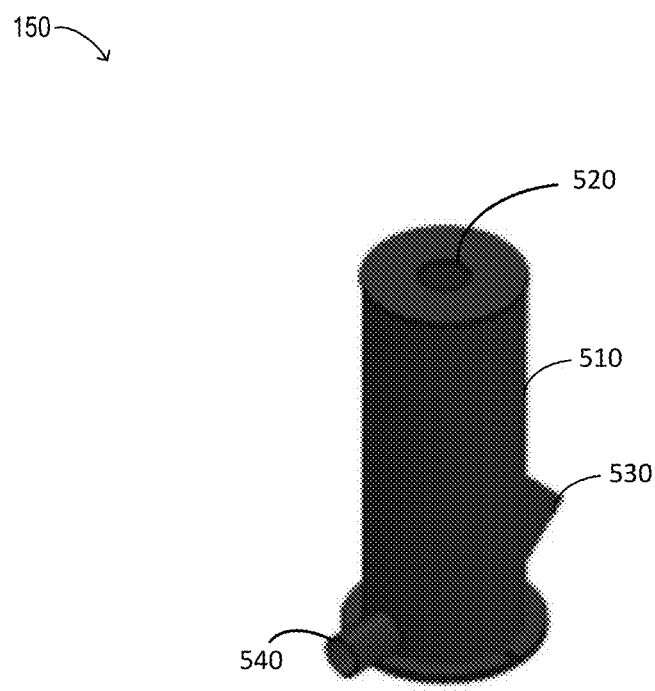
FIG. 5 is a schematic drawing of a heating system for recovery of solvents used in the improved system for refining used oil.

To enable further processing of the fluid mixture, the outlet channel 450 may be connected to an inlet channel 530 (shown in FIG. 5) of a housing 150 (shown in FIGS. 1 & 5). The sediment output channel 460 may in turn be connected to a tube-shaped outlet 155 (shown in FIG. 1) for transferring the sediments to the waste storage housing 130.

The external structure of the housing 150 is depicted in FIG. 5. As shown, the housing 150 includes a cylindrical shaped main body 510 which is connected to an inlet channel 530 for receiving the fluid mixture from the reservoir 140 and an outlet channel 540 through which, after being processed, any remaining fluid in the housing 150 may flow out to a storage unit 185 (shown in FIG. 1). When inside the housing 150, the fluid mixture may be heated to separate the refined oil from the solvent solution. This is done to recover and recycle the solvent solution for further use and to minimize the amount of waste produced by the system 100.

The separation process is aided by heating, because the boiling point of the compounds in the fluid mixture are generally very different. The boiling point of the solvents is usually below the boiling point of the refined oil. In one implementation, the boiling point of the refined hydrocarbon compounds making up the refined oil is between 190 degrees to 330 degrees Celsius, while the boiling point of the solvent mixture is approximately 69 degrees Celsius. This significant difference enables separation of the solvents from the refined oil through vaporization and distillation. This may be done, by heating the housing 150 to a temperature conducive to vaporizing the solvents. To do this, the housing 150 may include a thermometer (not shown) for measuring its internal temperature and a display for displaying the temperature outside the housing 150. Once, vaporized, the solvent vapors may escape the housing 150 through an opening 520 of the housing 150. The remaining fluid inside the housing 150, at this stage, includes hydrocarbon compounds that make up the refined oil. This fluid can exit through the outlet channel 540 which is connected to a tube 188 (shown in FIG. 1) for routing the refined oil to the storage unit 185 (shown in FIG. 1). The storage unit 185 may act, as a combiner, in one implementation, to combine the hydrocarbon compounds in the recovered fluid. The combined fluid can then be used as a source of energy or base oil for conversion into a variety of oils.

The housing 150 is heated with a heating element 160 (shown in FIG. 1). The heating element may include heating coils that are connected to a source of power 165, as shown in FIG. 1. In one implementation, the source of power is solar panels configured to generate electricity from the sun, and thus enable the system 100 and heating elements 160 to operate with minimal need for external power. Furthermore, various other types of heating elements and sources of power are known in the art and can be used to heat the housing 150 and provide the source of energy for the heating elements used. For example, the system 100 may include, in addition to the solar panels, a connection to a power outlet that can be used when sufficient solar energy is not available or may include batteries powered by the solar panels. In an alternative implementation, hot water may be used for heating the housing 150. The heating element may be connected to power switch (not shown) that can be used to turn the heating element on and off. The switch may be used, for example, to turn off the heating element, once the temperature display shows that the internal temperature of the housing 150 has reached a desired temperature.

The housing 150 is connected, through the opening 520, to a tube 170 for transferring the solvent vapors to a condensation unit 175. The condensation unit 175 is cylindrical in shape, in one implementation, and includes an input channel 180 connected to the tube 170 for receiving the vapors and an output channel 190 connected to one of the tube-shaped outlets 125 for transferring the recycled solvents back to the reactor 115 for reuse. The output channel 190 may be connected to a valve 195 for opening and closing the passageway from the condensation unit 175 to the reactor 115, as needed. The condensation unit is configured to change the physical state of the vapors back to liquid. This is generally done by cooling the vapors, which can be done in a variety of ways known in the art, such as using cold water flow.

It should be noted that, even though only one set of elements (pipe 135, reservoir 140, housing 150, heating element 160, solar panel 165, tube 170, condensation unit 175, etc.) are discussed herein, system 100 includes four sets of each of these elements, with each set being connected to and working in concert with one set of the tube-shaped outlets 120. This is done, in one implementation, in order to speed up the process and increase efficiency, as having multiple reservoirs and housings decreases the amount of time required to process and refine a given amount of used oil. This is helpful because the process of separation and sedimentation is generally very time-consuming. Thereby, by having four reservoirs instead of one, the amount of time required to refine a given amount of used oil can be reduced by approximately 75%.

Figure 6:
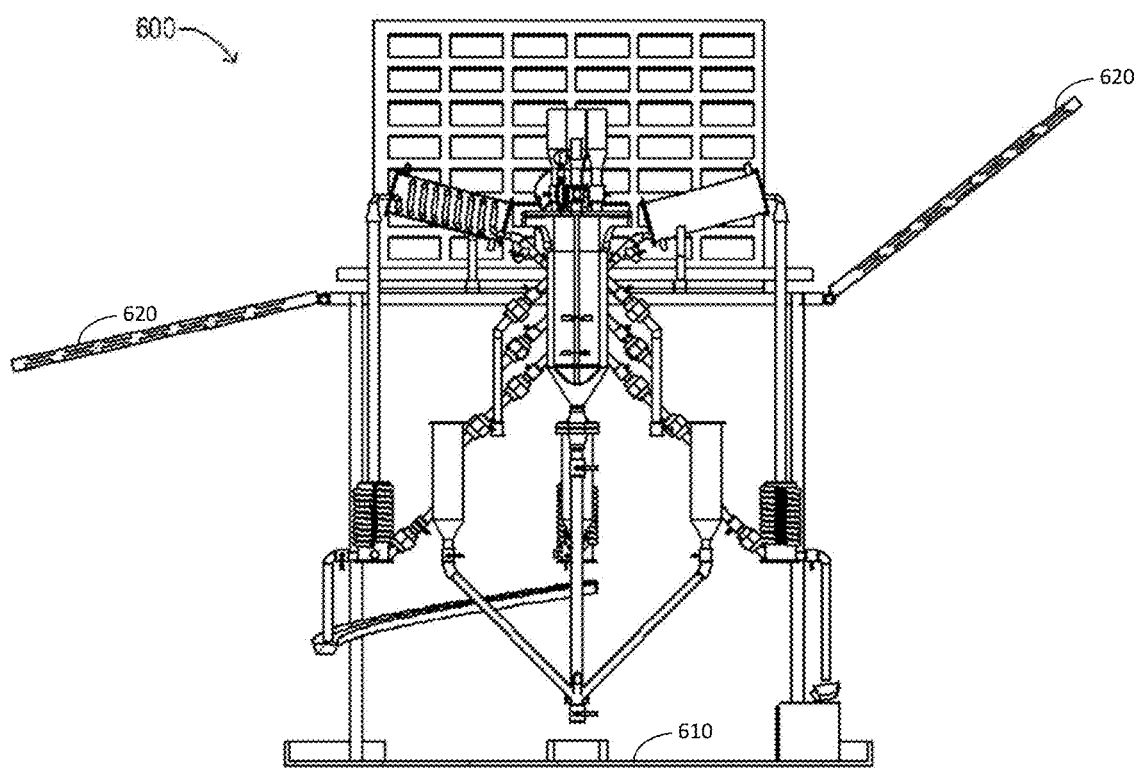
FIG. 6 is a schematic drawing of a portable improved system for refining used oil. using solar panels as the source of energy.

FIG. 6 depicts a top view of a complete improved system 600 for refining used oil, which uses solar panels. As can be seen, the system 600 is small and lightweight enough that it can be installed on a movable base 610. The movable base 610 may be attached to multiple wheels (not shown) that make the entire system 600 portable. System 600 also includes four solar panels 620 (only two are shown) that can be used to power the system.

Accordingly, the improved system for refining used oil provides a portable, energy self-sufficient and inexpensive system for simple and efficient treatment of a variety of used oil. The system is easy and inexpensive to operate and it saves time which results in further cost savings. Moreover, the system recycles the solvents used for treating the used oil and produces minimal waste products, thereby providing an environmentally friendly system and method for treating used oil. Additionally, the improved system can operate with renewable energy, thus obviating the need for use of fossil fuels and thus reducing operation costs.

The separation of various components in the examples described above should not be understood as requiring such separation in all examples, and it should be understood that the described components and systems can generally be integrated together in a single packaged into multiple systems.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various implementations for the purpose of streamlining the disclosure. This method of disclosure is not to be interpreted as reflecting an intention that the claimed implementations require more features than are expressly recited in each claim. Rather, as the following claims reflect, inventive subject matter lies in less than all features of a single disclosed implementation. Thus, the following claims are hereby incorporated into the Detailed Description, with each claim standing on its own as a separately claimed subject matter.

What is claimed is:

1. A system for treating used oil comprising:
a reactor having at least one inlet port for receiving used oil and a solvent into a main body of the reactor, the main body providing an environment for the used oil and the solvent to have a chemical reaction to produce a fluid mixture and at least some waste byproducts, the reactor having at least one fluid outlet for routing the fluid mixture out of the main body and one opening for routing the waste byproducts out of the reactor;
a reservoir connected to the at least one fluid outlet for receiving the fluid mixture, the reservoir having a reservoir main body for providing an environment for the fluid mixture to further dissipate waste byproducts to a bottom layer of the fluid mixture, the reservoir also having an outlet channel for routing a top layer of the fluid mixture outside of the reservoir main body and the reservoir having a reservoir waste outlet channel for routing the dissipated waste byproducts outside the reservoir;

a housing connected to the reservoir outlet channel for receiving the top layer of the fluid mixture, the housing having a top opening and a housing outlet channel;

a heating unit for heating the housing to cause the solvent present in the top layer of the fluid mixture to vaporize and escape through the top opening;

a condensation unit for receiving the vaporized solvent and turning the vaporized solvent to liquid, the condensation unit having an outlet channel for routing the liquid into the main body of the reactor for reuse; and a storage unit for collecting treated oil;

wherein the housing outlet channel provides a route for any remaining fluid in the housing after the vaporized solvent has escaped to flow out of the housing and into the storage unit.

2. The system of claim 1, further comprising a source of energy connected to the at least one heating unit for providing energy to the heating unit.

3. The system of claim 1, wherein the source of energy comprises at least one solar panel.

4. The system of claim 1, wherein the housing includes a thermometer configured to measure an internal temperature of the housing.

5. The system of claim 4, further comprising a display configured for displaying the internal temperature of the housing.

6. The system of claim 1, wherein the reactor includes on inlet port for receiving the used oil and one inlet port for receiving the solvent.

7. The system of claim 1, further comprising a mixer for mixing the used oil and the solvent in the reactor to facilitate the chemical reaction.

8. The system of claim 7, wherein the mixer includes at least one set of impellers.

9. The system of claim 7, wherein the mixer is changeable.

10. The system of claim 1, further comprising a waste storage unit for receiving the waste byproducts.

11. The system of claim 10, further comprising a tube connected to the opening of the reactor for routing the waste byproducts out of the reactor and into the waste storage unit.

12. The system of claim 11, wherein the tube includes a control valve for opening and closing a passageway between the opening of the reactor and the waste storage unit.

13. The system of claim 10, further comprising a tube connected the reservoir waste outlet channel for routing the waste byproducts out of the reservoir and into the waste storage unit.

14. The system of claim 13, wherein the tube includes a control valve for opening and closing a passageway between the opening of the reservoir waste outlet channel and the waste storage unit.

15. The system of claim 1, wherein the reactor includes at least one set of fluid outlets, the at least one set of fluid outlets having three tube-shaped fluid outlets.

16. The system of claim 15, further comprising at least one pipe configured to route the fluid mixture out of the three tube-shaped fluid outlets and into the reservoir.

17. The system of claim 16, where the pipe includes a control valve for opening and closing a passageway between the three tube-shaped fluid outlets and the reservoir.

18. The system of claim 1, wherein the reactor includes four sets of fluid outlets, each set of fluid outlets having three tube-shaped fluid outlets.

19. The system of claim 18, wherein each set of fluid outlets is connected to a separate reservoir, and each separate reservoir is connected to a separate housing.

20. The system of claim 19, wherein each housing has a separate heating unit, and each housing is connected to a separate condensation unit.

* * * * *